(12) United States Patent
Dey et al.

(10) Patent No.: US 8,375,599 B2
(45) Date of Patent: Feb. 19, 2013

(54) HOUSEHOLD APPLIANCE, PARTICULARLY FOR DRYING A LAUNDRY ARTICLE

(75) Inventors: Uwe Dey, Berlin (DE); Harald Moschütz, Grossbeeren (DE); Henrik Volkers, Braunschweig (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 349 days.

(21) Appl. No.: 12/937,724

(22) PCT Filed: Apr. 15, 2009

(86) PCT No.: PCT/EP2009/054435
§ 371 (c)(1),
(2), (4) Date: Oct. 14, 2010

(87) PCT Pub. No.: WO2009/130145
PCT Pub. Date: Oct. 29, 2009

(65) Prior Publication Data
US 2011/0030239 A1 Feb. 10, 2011

(30) Foreign Application Priority Data
Apr. 21, 2008 (DE) .......................... 10 2008 019 920

(51) Int. Cl.
*F26G 11/00* (2006.01)
(52) U.S. Cl. .............................. 34/595; 34/610; 38/12.27
(58) Field of Classification Search ..................... 34/595, 34/601, 606, 610; 68/12.27
See application file for complete search history.

(56) References Cited

U.S. PATENT DOCUMENTS

| 2,540,955 | A | * | 2/1951 | Moore ............................ 34/605 |
| 5,588,313 | A | | 12/1996 | Hildebrand |
| 5,758,905 | A | | 6/1998 | Hama et al. |
| 6,691,536 | B2 | * | 2/2004 | Severns et al. ............... 68/12.27 |
| 7,325,333 | B2 | * | 2/2008 | Tadano et al. ................... 34/604 |
| 7,356,945 | B2 | * | 4/2008 | Choi et al. ....................... 34/597 |
| 7,543,396 | B2 | * | 6/2009 | Nishino et al. .................. 34/606 |
| 7,895,770 | B2 | * | 3/2011 | Bae et al. ......................... 34/595 |
| 7,921,578 | B2 | * | 4/2011 | McAllister et al. ............. 34/597 |
| 2004/0010937 | A1 | * | 1/2004 | Naganawa et al. ............. 34/595 |
| 2004/0045187 | A1 | * | 3/2004 | Curry et al. ...................... 34/595 |

(Continued)

FOREIGN PATENT DOCUMENTS

| DE | 2643497 A1 | 4/1978 |
| DE | 19842644 A1 | 3/2000 |

(Continued)

*Primary Examiner* — Stephen M. Gravini
(74) *Attorney, Agent, or Firm* — James E. Howard; Andre Pallapies

(57) ABSTRACT

A household appliance for drying a laundry item, the household appliance having a treatment chamber and a closed process air circuit to feed process air through the treatment chamber. The process air circuit includes a blower to move the process air; a condenser to condense out moisture in the process air; a heater to heat the process air; a measurement device to determine a temperature of the process air; and a controller to control the blower and the heater as a function of the measurement signal. An analyzer determines an energy requirement to dry the laundry item prior to initiating a drying process for the laundry item. An integrator determines an energy input to the process air via the heater up to a respective measurement time. A comparator compares the energy input with the energy requirement and ends the drying process when the energy input matches the energy requirement.

16 Claims, 1 Drawing Sheet

U.S. PATENT DOCUMENTS

| | | | |
|---|---|---|---|
| 2004/0216326 A1* | 11/2004 | Kitamura et al. | 34/597 |
| 2006/0117596 A1* | 6/2006 | Kim et al. | 34/607 |
| 2008/0141558 A1* | 6/2008 | Bae et al. | 34/595 |
| 2011/0030239 A1* | 2/2011 | Dey et al. | 34/524 |
| 2011/0209357 A1* | 9/2011 | Ediger et al. | 34/595 |

FOREIGN PATENT DOCUMENTS

| | | |
|---|---|---|
| DE | 19939274 A1 | 2/2001 |
| DE | WO2007138029 A1 | 12/2007 |
| DE | 102008019920 A1 * | 10/2009 |
| EP | 0029810 A1 | 6/1981 |
| EP | 0573703 A1 | 12/1993 |
| EP | 0870859 A1 | 10/1998 |
| EP | 1420104 A1 | 5/2004 |
| FR | 2894996 A1 | 6/2007 |

* cited by examiner

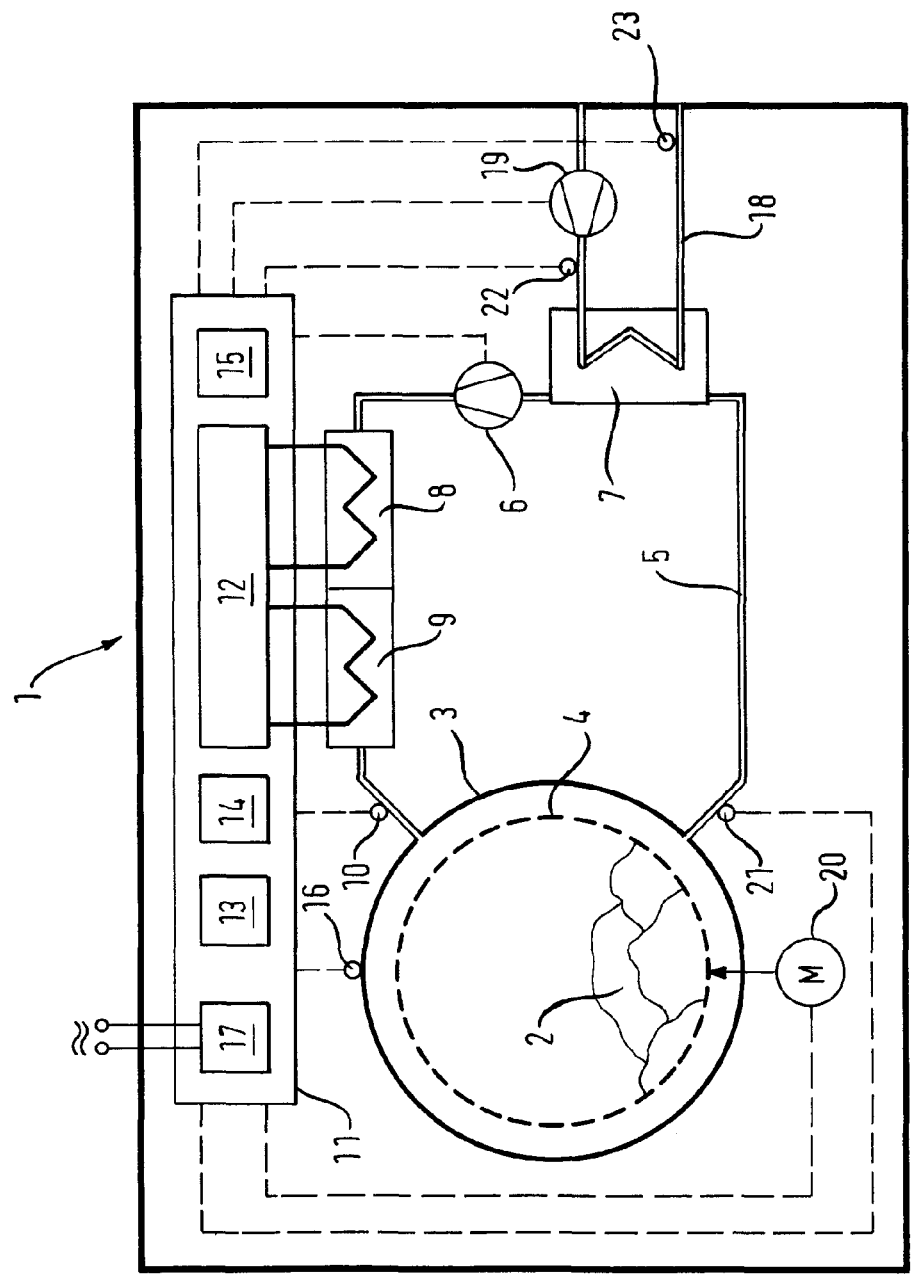

HOUSEHOLD APPLIANCE, PARTICULARLY FOR DRYING A LAUNDRY ARTICLE

BACKGROUND OF THE INVENTION

The invention relates to a household appliance, particularly for drying a laundry article, comprising a treatment chamber for receiving the laundry article, a closed process air circuit for feeding process air through the treatment chamber, said process air circuit featuring a blower for moving the process air, a condenser for condensing out moisture carried in the process air, a heating arrangement for heating the process air and a first measurement device for determining a temperature of the process air when entering the treatment chamber, and a control device for controlling the blower and the heating arrangement as a function of a first measurement signal of the first measurement device.

Such a household appliance emerges from WO 2007/138029 A1. This known household appliance is a washer dryer, in other words a household appliance that can both wash and dry laundry. Firstly it contains an outer tub to hold washing liquor and a drum disposed in a rotatable manner in the outer tub, in which drum the laundry article to be treated must be placed. All the usual components of a simple washing machine are present in and on the outer tub, in particular a heater for the washing liquor, an inlet device for water and laundry care products and a discharge device with a washing liquor pump to pump away the washing liquor after a washing process. Present for the drying function is a drying tunnel, which is connected to the outer tub at two points and contains a blower, a condenser and a heating arrangement and cyclically heats and cools an essentially closed circuit of process air, which passes through the damp laundry article in the drum. A temperature sensor is provided, to allow the temperature of the process air flowing into the outer tub to be measured and the heating arrangement to be controlled as a function of this temperature. A correspondingly set up control device is provided in the household appliance.

For technical background relating to a household appliance, particularly for drying a laundry article, see also the documents EP 0 870 859 A1 and U.S. Pat. No. 5,588,313.

For certain particularities of the controller of an electrical consumer, particularly of a heating unit, see document EP 0 719 972 A2. According to this provision is made to design a controller for a heating unit connected to the power supply network so that interference by switching operations of the controller affecting the power supply network is avoided as far as possible.

BRIEF SUMMARY OF THE INVENTION

The object of the invention is to specify a household appliance of the type mentioned in the introduction, with which fast drying of a laundry article designed for low primary energy consumption can take place.

A household appliance according to the independent claim is specified to achieve this object. Preferred developments of this household appliance are specified in the dependent claims, it being possible to combine a number of preferred developments while remaining within the scope of the invention, if this is not specifically stated herein.

Accordingly the inventive household appliance, particularly for drying a laundry article, comprising a treatment chamber for receiving the laundry article, a closed process air circuit for feeding process air through the treatment chamber, said process air circuit featuring a blower for moving the process air, a condenser for condensing out moisture carried in the process air, a heating arrangement for heating the process air and a first measurement device for determining a temperature of the process air when entering the treatment chamber, and a control device for controlling the blower and the heating arrangement as a function of a first measurement signal of the first measurement device, is characterized by an analyzer associated with the control device for determining an energy requirement for drying a laundry article placed in the treatment chamber prior to the initiating of a drying process for the laundry article, an integrator for determining an energy input by way of the heating arrangement to the process air up to a respective measurement time and a comparator for comparing the energy input with the energy requirement and for ending the drying process when the energy input matches the energy requirement.

Provision is therefore made with the inventive household appliance for an energy requirement for the drying process to be determined beforehand. This can be done by means of known measures such as weighing the laundry article, it being possible for this process to be supported by an assumption about the moisture content of the laundry article. This is the case particularly, because a conventional spinning process, which completes a conventional washing process, leaves the laundry article with a relatively precisely known moisture content. This can be particularly advantageous when the inventive household appliance is set up to both wash and dry the laundry article. In the meantime it is normal to determine data about the laundry article to be treated as part of the washing process, in particular its weight and the type of textiles present therein. To this end measurements of the mass of the dry laundry article and measurements of its capacity for absorbing water or washing liquor can be taken in the known manner. It may also be helpful to determine the mass of the still damp laundry article again after the end of the washing process. In any case it is possible to obtain relatively precise information about the probable energy requirement of the planned drying process, whereby the possibility should also not be excluded within the meaning of the invention of adding appropriately to a value obtained by evaluating available data for a laundry article in order to obtain a default setting for the energy requirement that ensures a desirable result, even if the evaluation is incorrect.

Therefore a preferred development of the inventive household appliance is characterized in that the analyzer comprises a device for analyzing, particularly weighing and/or determining a composition of the laundry article and for determining the energy requirement from a result of the analysis.

In one particularly preferred development of the inventive household appliance the household appliance is set up to both wash and dry the laundry article. It is further preferable here for the analyzer to be set up to analyze the laundry article before washing and to determine at least one parameter for a washing process, as set out above.

In another preferred development of the inventive household appliance the treatment chamber contains a rotatable drum, the drum being intended to receive the laundry article. The treatment chamber here can comprise an outer tub, which for its part encloses the drum, as would be preferred for a washer dryer. The treatment chamber can also be embodied without an enclosing outer tub, as would be preferred for a simple dryer.

The process air circuit in the inventive household appliance is preferably essentially closed, thereby determining that the moisture evaporated from the laundry article and carried away by the process air circulating in the process air circuit is deposited by condensation and separated from the process air. In a conventional washer dryer this deposited moisture is collected in the outer tub below the drum and discharged by means of the washing liquor pump that is anyway present. This prevents such moisture being deposited in the area around the household appliance and at the same time renders superfluous the discharge of moist process air from the building in which the household appliance is set up.

The drying chamber is preferably disposed behind the heating arrangement and the condenser behind the drying chamber in the process air circuit of the inventive household appliance when viewed in the direction of the process air.

Particularly preferred is also a development of the inventive household appliance, according to which the condenser is an indirectly cooled condenser, in which there is no direct contact between the air flow to be cooled and the cooling agent used in each instance. The choice of water taken from a water supply network to condense the moisture carried by the process air in a washer dryer is still of certain interest as before, as it can be realized in a relatively simply configured condenser. However this choice should be rejected from the point of view of conserving natural resources to the greatest possible degree.

An indirectly cooled condenser can be realized here as an air-cooled condenser, with the air serving as the cooling agent being taken from the area around the household appliance and being fed back there again after cooling has taken place. In this context the heating arrangement can be designed as electrical or thermal, in other words a heating arrangement operated by combusting a suitable fuel. As before this makes for a relatively economical household appliance.

Of major interest in this context and particularly preferred in respect of the consumption of primary energy for drying purposes is a development in which the indirectly cooled condenser is embodied as a heat sink of a heat pump in the household appliance. The heating arrangement would then be a heat source of the heat pump. The heat pump takes in heat from the process air in the condenser, pumps this heat to the heating arrangement and discharges it there back to the process air. This pump process requires a certain outlay of thermal energy but when the heat pump is designed appropriately, this outlay is much smaller than the outlay of thermal energy flowing out of the heater or heat source to the process air flow. Such a heat pump can be embodied as a compressor/heat pump, in which a cooling agent circulates which is cyclically evaporated in the condenser as it absorbs heat from the air flow and condensed in the condenser as it emits heat to the air flow. A heat pump operating by means of a reversible sorption process, a regenerative gas circuit process or the Peltier effect is also conceivable. It is important to emphasize that the energy input to be determined in such a household appliance is the energy input reaching the process air flow by way of the heat source, not the input reaching the heat pump to operate it.

Also particularly preferred is a development of the inventive household appliance, according to which the control device is set up to activate the heating arrangement so that the temperature is kept essentially constant during the drying process. A relatively simple method for controlling the heating arrangement is thus defined. With this method a very precisely defined dependency of the introduction of heating power into the drying process by way of the heating arrangement is defined. After an initially required heating of the process air and corresponding components of the household appliance the heating power required to maintain the temperature is essentially defined by the power that has to be expended to evaporate moisture from the laundry article at the prevailing temperature. If the temperature of the process air is kept constant as it flows up to the laundry article, temperatures at other points of the process air circuit also remain relatively constant and at most change to the extent that the laundry article dries as the drying process progresses and therefore the rate of evaporation of moisture out of the laundry article drops. Thus transient conditions that may result due to the discharge or absorption of heat by the components of the household appliance are of no or at most very minor significance. Precise control of the drying process is therefore possible by observing the heating power input into the drying process while the process air remains at a largely constant temperature at the specified site.

Also particularly preferred is a development of the inventive household appliance in which the heating arrangement comprises at least one electrical heating element and a switching arrangement, which can be activated by the control device as a function of the first measurement signal by means of a control signal, for the elective switching of the at least one heating element. While the preference for an electrical heating arrangement is in principle obvious, the preference for a heating arrangement with at least one switchable heating element results from the circuits and switching arrangements now available, which allow almost continuous control of the heating power even with a relatively simply embodied heating element whilst still complying with the relevant provisions relating to avoiding any impact on an electrical power supply network.

Particularly preferred in this context is a development of the inventive household appliance in which the heating arrangement comprises a first electrical heating element and a second electrical heating element and wherein the switching arrangement is intended for the elective switching of the first and second heating elements, the first electrical heating element having a first nominal electrical power, which is greater than a second nominal electrical power of the second electrical heating element. Surprisingly it has proven that a relatively simple heating arrangement, featuring only four stages for the heating power to be emitted according to this embodiment, is sufficient to achieve a temperature of the process air that is sufficiently constant to implement the described method. The transient conditions occurring in any case have essentially no significant adverse effect on the inventively provided determination of the integral of the heating power of the heating arrangement, according to the energy input up to the respective measurement time. A relatively simple and robust configuration of the heating arrangement thus results.

In this preferred heating arrangement in the inventive household appliance the sum of the first nominal electrical power and the second nominal electrical power also preferably amounts to around 2000 watts, with in particular the first nominal power being around 1400 watts and the second nominal power being around 700 watts.

With this preferred heating arrangement in the inventive household appliance in particular the integrator is set up to integrate the control signal. It is therefore possible not to provide a specific measurement device for the heating power generated by the heating arrangement and to refer to a signal that is present anyway in the control device to determine this heating power. It is within the scope of the invention when utilizing this signal to refer to further existing information, which allows the details of the heating power to be made more specific. One measure preferred in this context is to provide a second measurement device in the integrator for measuring an electrical supply voltage of the heating arrangement and also to set the integrator up to integrate the control signal proportionally in relation to the supply voltage. If this supply voltage is known, it is possible to obtain very precise information about the heating power taking into account the electrical resistances that are essentially constant and can be predetermined for the control device as constant, permanently defined parameters.

BRIEF DESCRIPTION OF DRAWINGS

An exemplary embodiment of the invention is outlined in the drawing and is described in more detail below.

The single FIGURE in the drawing shows a household appliance 1 in the form of a washer dryer 1, in which a laundry article 2 can in particular be dried, in other words for the exemplary embodiment can be washed and dried.

DETAILED DESCRIPTION OF EXEMPLARY EMBODIMENTS OF THE PRESENT INVENTION

To this end the household appliance 1 comprises a treatment chamber 3 for receiving the laundry article 2, a rotatable drum 4 being disposed in the treatment chamber 3 to receive the laundry article 2. For the drying process the household appliance 1 also comprises a closed process air circuit 5 for feeding process air through the treatment chamber 3, said process air circuit 5 featuring a blower 6 for moving the process air, a condenser 7 for condensing out moisture carried in the process air, a heating arrangement 8, 9 for heating the process air and a first measurement device 10, in the present instance a temperature sensor 10, for determining a temperature of the process air when entering the treatment chamber 3. The household appliance 1 also features a control device 11 for controlling in particular the blower 6 and the heating arrangement 8, 9 as a function of a first measurement signal of the first measurement device 10. The design and structure of the control device 11 are less relevant in the present instance. According to current practice the control device 11 contains a programmable processor and memory and all the modules of the control device 11 described in more detail below, apart from those modules which carry out switching processes or have to exchange signals with further components of the household appliance 1, are components of an operating program stored in the memory.

The heating arrangement 8, 9 is structured in two parts and comprises an electrical first heating element 8 and an electrical second heating element 9, both heating elements 8, 9 being switched by a switching arrangement 12 associated with the control device 11. The first heating element 8 has a nominal electrical power of around 1400 watts and the second heating element 9 has a nominal electrical power of around 700 watts. These heating elements 8 and 9 and the switching arrangement realize a four-stage heating system with electively switchable heating powers of 0 watts, 700 watts, 1400 watts and 2100 watts in the process air circuit 5. This four-stage system cannot and should not be referred to as "quasi analog" within the meaning of standard practice; it has however proven that this heating system is sufficiently refined to be able to implement the control method described below with satisfactory precision for a particular drying process.

Associated with the control device 11 for this drying process are an analyzer 13 for determining an energy requirement for drying the laundry article 2 placed in the treatment chamber 3 before the initiating of a drying process for the laundry article 2, an integrator 14 for determining an integral of a power expended to the process air by way of the heating arrangement 8, 9 up to the respective measurement time, according to the energy input up to this measurement time, during the drying process and a comparator 15 for comparing the integral with the energy requirement and for ending the drying process when the integral or energy input matches the energy requirement.

The control device 11 therefore determines, before the initiating of the drying process, how much heat energy is required for drying purposes and sets the energy requirement accordingly. To this end the analyzer 13 uses a device 16 for analysis, which in particular contains a force sensor 16, which can be used to weigh the laundry article 2. In the present instance the household appliance 1 is set up to both wash and dry the laundry article 2. Therefore the force sensor 16 and analyzer 13 can be used to weigh the laundry article 2 before the washing process, when it is still dry. As the washing process is being initiated, the control device can use a suitable sensor system, which is known per se and is not described here, to determine the capacity of the laundry article 2 to absorb water and from this to draw a conclusion about the textiles contained therein. If the laundry article is also weighed after the end of the washing process, which according to standard practice may include a spin operation, it is possible to draw a relatively accurate conclusion about the quantity of water contained. The analyzer can use all this information at the start of the drying process following the washing process to determine the energy required to eliminate the water contained from the laundry article 2 very precisely.

During the drying process the integrator 14 evaluates the heating power input into the process air duct 5 by way of the heating arrangement 8, 9 and determines its integral as the energy input up to the respective determination time or measurement time. It also integrates and adds together the control signals, which are weighted according to the nominal powers, as output to the heating elements 8, 9 by the switching arrangement 12. An electrical voltage of the energy supply network, to which the household appliance 1 is connected, measured by a second measurement device 17, a voltage meter, is used in the manner of a proportionality factor for correction purposes.

The comparator 15 compares the integral determined as described with the previously determined energy requirement and ends the drying process as soon as the integral matches the energy requirement.

In the essentially closed process air circuit 5 the heating arrangement 8, 9 follows the blower 6, the blower 6 follows the condenser 7 and the condenser 7 follows the treatment chamber 3 in the direction of the flowing process air in the present instance. The condenser 7 is cooled indirectly, namely by air, with the air being fed to it through an open cooling air duct 18 by means of a cooling air blower 19. A motor 20 serves to drive the drum 4 with the laundry article 2.

A number of further temperature sensors 21, 22 and 23 on the process air duct 5 or the cooling air duct 18 respectively may be considered to be representative of a very wide range of further sensors, which may be used for further refined control of the washing and drying processes in the household appliance 1—the option of such an extended sensor system not being restricted to the exemplary embodiment described here. The different temperature measurement values that can be obtained with the sensors 21 to 23 can be used to control the drying process with redundancy and thus with a particularly high level of stability.

LIST OF REFERENCE CHARACTERS

1 Household appliance
2 Laundry article
3 Treatment chamber

4 Drum
5 Process air circuit
6 Blower
7 Condenser
8 Heating arrangement, first heating element
9 Heating arrangement, second heating element
10 First measurement device, first temperature sensor
11 Control device
12 Switching arrangement
13 Analyzer
14 Integrator
15 Comparator
16 Analysis device
17 Second measurement device, voltage meter
18 Cooling air duct
19 Cooling air blower
20 Motor
21 Second temperature sensor
22 Third temperature sensor
23 Fourth temperature sensor

The invention claimed is:

1. A household appliance for drying a laundry item, the household appliance comprising:
 a treatment chamber to receive the laundry item;
 a closed process air circuit to feed process air through the treatment chamber, the closed process air circuit comprising:
  a blower to move the process air;
  a condenser to condense out moisture carried in the process air;
  a heater to heat the process air;
  a first measurement device to determine a temperature of the process air when the process air enters the treatment chamber and to provide a first measurement signal; and
  a controller to control the blower and the heater as a function of the first measurement signal;
 an analyzer associated with the controller, the analyzer to determine an energy requirement to dry the laundry item prior to initiating a drying process for the laundry item;
 an integrator to determine an energy input to the process air via the heater up to a respective measurement time; and
 a comparator to compare the energy input with the energy requirement and to end the drying process when the energy input matches the energy requirement.

2. The household appliance of claim 1, wherein the analyzer analyzes the laundry item and determines the energy requirement from a result of the analysis.

3. The household appliance of claim 2, wherein the analyzer at least one of weighs and determines the composition of the laundry item.

4. The household appliance of claim 1, wherein the household appliance washes and dries the laundry item.

5. The household appliance of claim 4, wherein the analyzer analyzes the laundry item before washing the laundry item and determines a parameter for a washing process.

6. The household appliance of claim 1, wherein the treatment chamber includes a rotatable drum to receive the laundry item.

7. The household appliance of claim 1, wherein the closed process air circuit is essentially closed.

8. The household appliance of claim 1, wherein a drying chamber is behind the heater, and wherein the condenser is behind the drying chamber in the closed process air circuit when viewed in a direction of the process air.

9. The household appliance of claim 1, wherein the condenser is an indirectly cooled condenser.

10. The household appliance of claim 1, wherein the controller controls the heater so that the temperature is kept essentially constant during the drying process.

11. The household appliance of claim 1, wherein the heater includes an electrical heating element and a switching arrangement, the switching arrangement activated by the controller via a control signal and as a function of the first measurement signal in order to electively switch the electrical heating element.

12. The household appliance of claim 11, wherein the heater includes a first electrical heating element and a second electrical heating element; wherein the switching arrangement electively switches the first electrical heating element and the second electrical heating element; and wherein the first electrical heating element has a first nominal electrical power that is greater than a second nominal electrical power of the second electrical heating element.

13. The household appliance of claim 12, wherein the sum of the first nominal electrical power and the second nominal electrical power is about 2000 watts.

14. The household appliance of claim 13, wherein the first nominal electrical power is about 1400 watts and the second nominal electrical power is about 700 watts.

15. The household appliance of claim 11, wherein the integrator integrates the control signal.

16. The household appliance of claim 11, wherein the integrator includes a second measurement device to measure an electrical supply voltage of the heater, and wherein the integrator integrates the control signal proportionally to the electrical supply voltage.

* * * * *